United States Patent Office 3,425,051
Patented Jan. 28, 1969

3,425,051
ANALOG-TO-DIGITAL CONVERTER
Walter W. Smith, Pepperell, Mass., assignor to the United States of America as represented by the Secretary of the Air Force
Filed Mar. 10, 1965, Ser. No. 438,802
U.S. Cl. 340—347          6 Claims
Int. Cl. H03k 13/02

ABSTRACT OF THE DISCLOSURE

An analog-to-digital converter apparatus having a series of amplifiers with the gain of each amplifier being automatically and rapidly set by its control amplifier. Each amplifier stage employs two transistors and a large amount of negative feedback which makes the gain of the amplifier independent of the gain of the individual transistors. The gain of each amplifier stage is changed by applying a positive gate to a transistor switch which controls the amount of the feedback resistance. A slicer which produces the positive gate is externally connected to the input of the amplifier stage. Thus, when the input signal exceeds reference signal in the slicer control circuit, the positive gate is produced.

---

This invention relates to measuring and indicating systems, and more particularly, to solid-state circuitry for translating analog input signals into their corresponding digital form.

A prior art method commonly used for analog-digital conversion compares the amplitude of the signal, which may be undergoing wide variations, with fixed D-C reference levels. This comparison is then followed by amplification. However, a disadvantage to this method is that when small signals are compared with a reference voltage this voltage has to be set very precisely. Furthermore, it is customary to use other devices such as diodes or transistors as a part of this comparison circuit which may introduce variables which are large in relation to the small signal being compared. In the instant invention sufficient amplification is given to all signals *in advance of the comparison* by means of a novel amplifier so that all comparisons are made at levels where the above-mentioned variables become very small in comparison with the quantities being measured. This permits more precise quantizing of weak signals as the reference voltages are very large in comparison to the incoming signals. In fact, the weakest signal is compared with the highest of all the reference voltages instead of the smallest in other state of the art systems. The necessary amount of amplification for each incoming signal is determined very rapidly by means of a novel method which makes the decision of whether or not to amplify the signal simultaneously with the application of the signal to the input of the amplifier rather than by sampling the rectified and filtered output of the amplifier as is commonly done in other state of the art amplifiers embodying some form of automatic gain control. The necessity for filtering the control voltage slows down the action sufficiently to make impractical the measurement of radar signals on a pulse-by-pulse basis. Relatively large amounts of inverse radio frequency feedback are used at all times in the amplifiers to make them independent of variations in the gains of the transistors within practical working tolerances.

Accordingly, the principal object of the present invention is to provide a solid-state analog-to-digital converter which operates over a wider dynamic range than heretofore possible while maintaining high accuracy over the entire range, very rapid response, and a high degree of stability.

In accordance with the present invention, there is provided means for giving sufficient amplification to a high-frequency input signal to bring it up to a predetermined level. In the process of amplification a set of gates may be produced to reduce the gain of certain stages to unity so that the predetermined level will not be exceeded. These gates, being either positive or negative depending upon the strength of the received signal, can be considered to be digital bits. When the gates are combined in binary form they are a measure of how much the signal *did not* need to be amplified. These gates are combined in binary form by means of logic circuits and differentiated. The product of any of these differentiating circuits is a pair of spikes indicating that a change is taking place in the strength of the input signal and is used to inhibit momentarily any read-out which might produce an ambiguous or erroneous reading.

It is a feature of the invention that, instead of measuring the amplitude of the unknown signal at some arbitrarily chosen stage in the chain of amplifiers, only sufficient amplification is given to the signal to bring it up to a predetermined level, and any surplus gain is gated out. This amount is the amount by which the incoming signal exceeded the minimum signal which, when amplified by the entire gain of the amplifier chain, would yield a signal equal to a predetermined level.

Another feature of this invention is that small signals automatically pass through a chain of amplifiers and are amplified until their magnitude is very large in comparison with the forward drop through a diode and the reference voltages are correspondingly large. On the other hand, a signal which is large to start with exceeds a reference voltage immediately. This enables this device to measure signals having very wide dynamic range (80 db or 10,000:1 in voltage)—all measurements being made at relatively high signal levels.

In accordance with an additional feature of this invention, feedback is employed for stability and to make the gain of the amplifier chain independent of changes in the gain of the transistors being utilized, but a limitation is placed on the amount of feedback to avoid any instability.

It is a broad feature of this invention that the signal is sampled as it enters each amplifier stage and a decision is made almost instantaneously, since no filter is required, as to whether further amplification is needed. This makes the action of the amplifier, and hence the analog-digital conversion, able to follow a radar signal pulse by pulse.

Other objects, features and advantages of the present invention will be readily appreciated by reference to the following description when taken in conjunction with the accompanying drawings, which disclose, by way of example, the principle of the invention and the best mode, which has been contemplated, of applying that principle.

In the drawings, wherein like components have identical reference characters.

For a proper understanding of the instant invention it is desirable to consider the operation of the analog-digital converter when used in combination with a normalizing amplifier in a radar system. This combination is necessary to supply pulse-by-pulse information to direct the tracking of a target by the antenna system. Thus it is necessary to compensate for feeding greatly different field strengths into the input of the receiver for the output level of the receiver must be substantially independent of the input level. For example, in tracking satellites which are at a very great distance the signals received are very weak but for a large satellite such as Echo II the returned signal is very large and the amplifier must be able to accommodate both signals without sacrificing the sensitivity needed for the weak signal or overloading the receiver when the larger one is encountered. The normalizing amplifier used is of the type described in the article, "Fast AGC Amplifier Locks Monopulse Radar on Target," by W. W. Smith, Electronics, Sept. 27, 1963.

Analog-Digital Conversion is required to permit storage of amplitude information in memory flip-flops for use by a computer set to give real time indications of fluctuations in signal strength.

Figure 1:
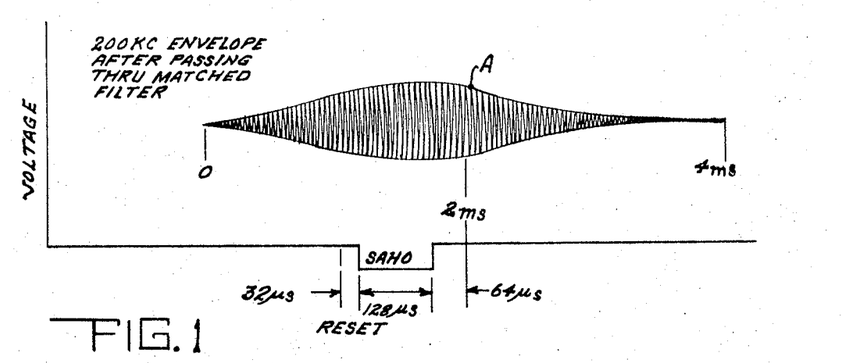
FIGURE 1 illustrates the relationship of external triggers to the received signal.

In radar operation all the memory flip-flops are set to a "zero" state by a reset pulse from the station clock after each pulse is transmitted. (For C.W. operation they can be reset periodically at any convenient interval.) When the converter is preceded by a matched filter, in a monopulse radar system, the resetting is done shortly before the signal builds up to a maximum. A typical matched filter response curve is shown in FIGURE 1. The drop-off following the point of inflection, A (after about the 2 millisecond point) is relatively sharp, but just before point A the amplitude is increasing very slowly. As illustrated, the memory flip-flops are reset about 200 μsec. before the point of inflection, and the signal is sampled during a 128 μsec. period when the signal is undergoing very little change.

Figure 2:
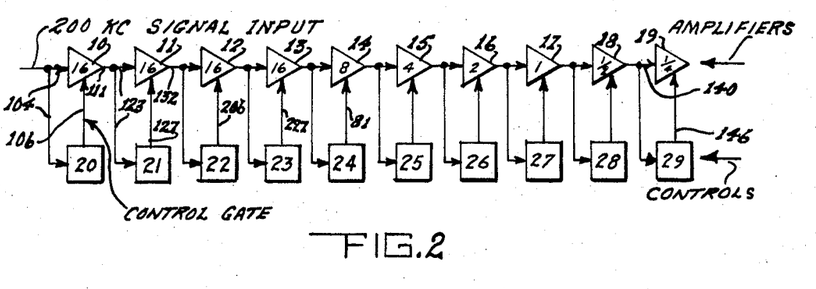
FIGURE 2 is a block diagram of the R.F. amplifier and control circuits.

The first step in determining which flip-flops are to be left in a "zero" condition, and which are to be set to "ones," is taken by passing the signal to be measured through a series of amplifiers 10-19 having the individual stage gains indicated in FIGURE 2.

Shown in FIGURE 2 are ten cascaded stages. Each stage can be switched so it has a gain of a fixed amount; or unity. In the instant embodiment four 16-db stages 10-13 in cascade are followed by an 8-db, 4-db, 2-db, 1-db, ½-db and ¼-db stages, 14-19, respectively. Each stage is gated by a corresponding control unit 20-29 (via lead 106 for example) to yield nominal gain or to pass the signal through unamplified with unity gain. Thus, large increments of amplification are added at the beginning if needed, and smaller amounts are added later. The signal passes on until sufficient amplification has been applied to bring the output to the desired amplitude. For example, the signal might rise ½-db in amplitude and produce a gate in the last 16-db stage, 13 (taking 16-db out of the chain) and then be amplified by the remaining 15½-db of amplification. The output would then be ¼-db below the desired value, which is within the desired tolerance. Tolerances can be narrowed by the addition of ⅛-db or even ¹⁄₁₆-db stages.

It is to be noted that the amount of amplification required is determined as the signal enters the amplifier. This eliminates any tendency towards oscillation encountered when a control signal is fed back from the output.

Figure 3:
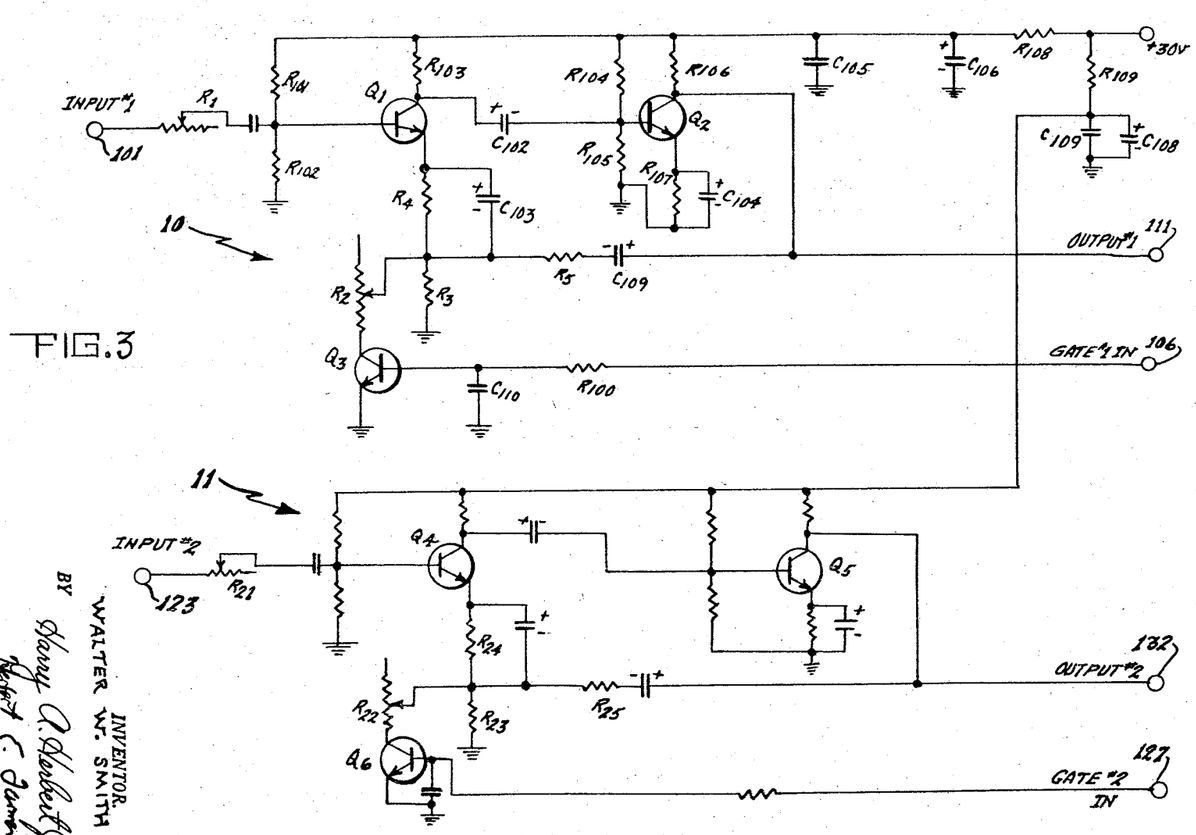
FIGURE 3 is a schematic diagram of two stages of the normalizing amplifier utilized.

Two amplifier stages, 10 and 11, are shown in FIGURE 3. Output 111 of first stage 10 is connected externally to input lead 123, of second stage 11. In considering the first stage only, in the absence of a positive gate, transistor $Q_3$ is open circuited and can be ignored. The gain of amplifier 10 is determined by the two unbypassed 4,700-ohm resistors, $R_5$ and $R_3$, giving the amplifier an internal gain of 6 db, but the voltage divider comprised of $R_1$ and the input circuit to $Q_1$ attenuates the signal by 6 db; thus stage 11 has an external (from input 101 to output 111) gain of unity. This may seem confusing, but is necessary because 100 percent feedback, that will produce unity gain without an attenuator, causes amplifier instability. However, since neither input 101 nor output 111 is aware of this subterfuge, the amplifier still has the necessary gain requirements. $Q_2$ performs the function of further amplifying the signal and producing the feedback mentioned above.

When a positive gate is applied to terminal 106, $Q_3$ conducts to the point where it becomes saturated. This shunts $R_2$ in parallel with 4,700-ohm resistor $R_3$ and decreases the feedback applied to $Q_1$. Table I shows how $R_2$ is adjusted to obtain the desired gain. Internally, the 16-db stage will have a gain of 16+6 or 22 db.

TABLE I

| Stage | Fixed ±1% | $R_2$ (ohms) | |
|---|---|---|---|
| | | + | Trim pot |
| 16 db | 360 | + | 100 |
| 8 db | 1K | + | 1K |
| 4 db | 3.6K | + | 1K |
| 2 db | 8.2K | + | 1K |
| 1 db | 13K | + | 10K |
| ½ db | 20K | + | 10K |
| ¼ db | 30K | + | 10K |

Figure 4:
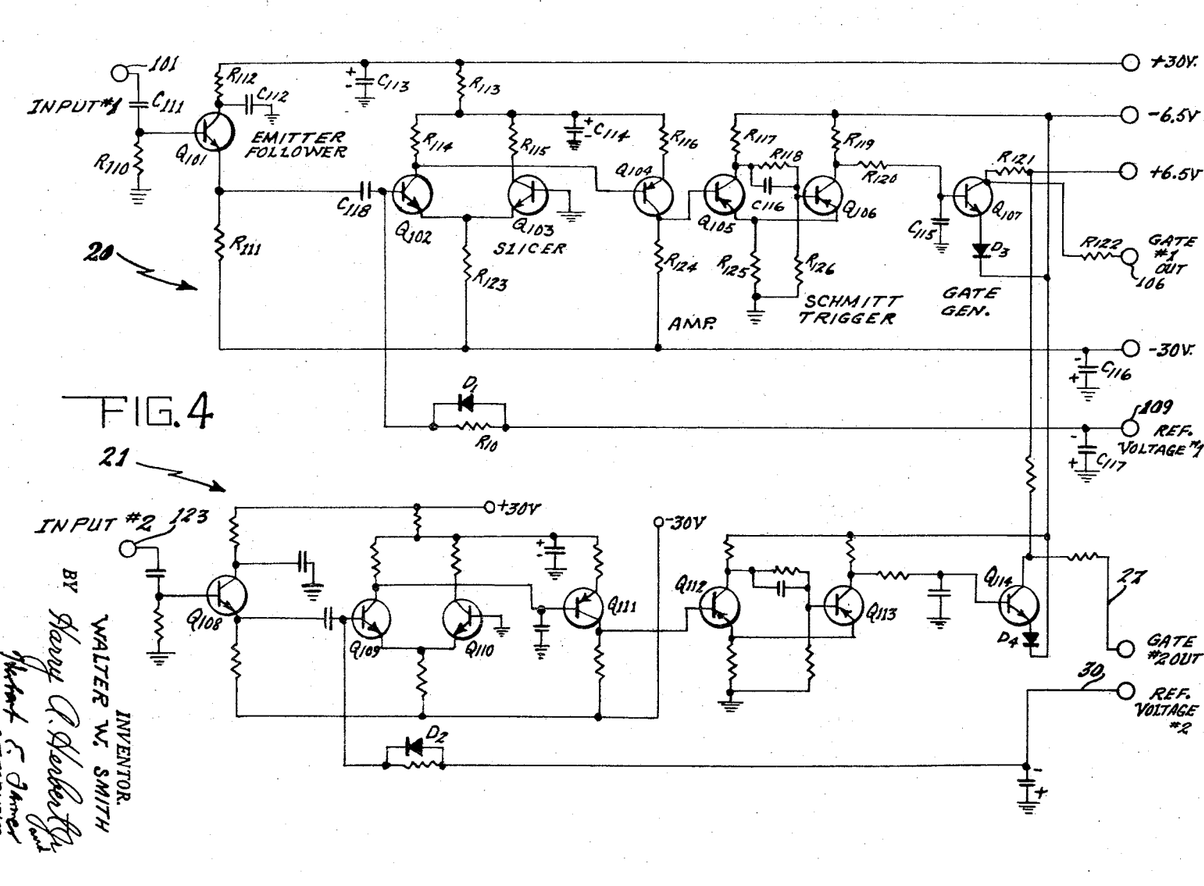
FIGURE 4 is a schematic diagram of the control units paralleling each amplifier stage.

Two of the control units 20 and 21 are shown in FIGURE 4. Considering only first control unit 20, input 101 is tied externally to the input of first amplifier 10. Thus, both the amplifier and its corresponding control unit receive the analog signal simultaneously. $Q_{101}$ is an emitter-follower that isolates the slicer comprising $Q_{102}$ and $Q_{103}$ and prevents loading of the signal circuit. The base of $Q_{103}$ is grounded, and $Q_{102}$ is prevented from conducting by negative-reference voltage 9 that is applied through clamping resistor R10 and diode $D_1$. When the peak-to-peak value of the input signal exceeds the reference voltage, $Q_{102}$ will conduct and apply a change to the base of amplifying transistor $Q_{104}$. The amplified signal is applied to the Schmitt trigger which comprises $Q_{105}$ and $Q_{106}$ which squares up the signal and applies it to $Q_{107}$. $Q_{107}$ then delivers a gate to terminal 106 and thence to amplifier 10. This gate not only swings to about 5 volts positive, but, in the presence of a large input signal, becomes negative with respect to ground by about 5 volts, assuring that switching transistor $Q_3$ in amplifier 10 will be left in a nonconducting state. Input 123 of second control unit 21 is connected externally to input 123 of second amplifier stage 11. All slicers are identical except for applied reference voltages. Application of the appropriate reference voltage will yield any desired slicing level.

In the instant embodiment, one millivolt (peak to peak) has been chosen arbitrarily as the minimum signal corresponding to 0-db. The maximum signal is 10 volts (peak to peak). This range can be extended by substituting transistors allowing a greater swing.

If the reference voltage is exceeded at any amplifier stage, a control gate (106, 127, e.g.) is produced at that stage. A 10-volt signal entering the chain produces gates in all the control units and leaves via lead 119 unchanged at 10 volts. On the other hand, a minimum signal (1 mv.) produces no gates; all the amplification available in the chain is used. A signal slightly over the minimum is amplified in every stage but the last one. A strong signal 140 (FIGURE 2) requiring no amplification up to this point entering the last stage 19 of a level with ¼ db of the maximum trips the control slicer in control unit 29 producing control gate 146. Gate 146 is used to set the ¼-db flip-flop. If the input signal were to rise another ¼-db the triggering action would be produced sooner— when the ½-db stage 18 was reached. Since no gain would then be added by this stage the last stage must do the final amplifying. Accordingly the ½-db flip-flop registers a "one" and all others, "zeroes."

Figure 5:
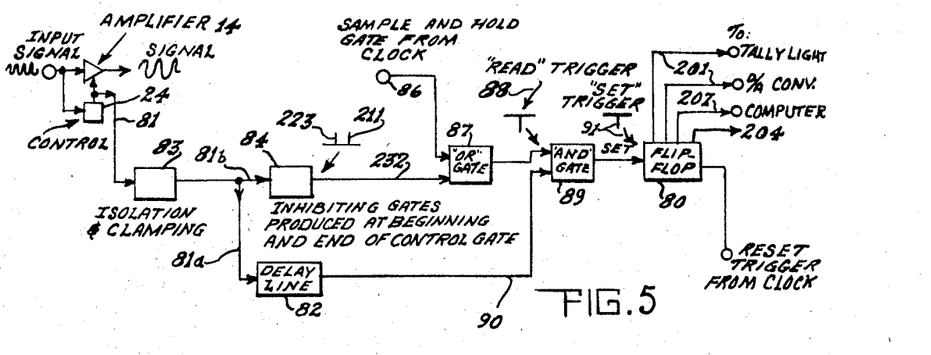
FIGURE 5 is a simplified block diagram for a typical channel.

Before considering the block diagram of the complete system (FIGURE 8), it is desirable to single out one flip-flop and examine the circuitry required to set it. The 8-db flip-flop 80 has been chosen as typical in FIGURE 5. Any of three possible conditions may exist at the sampling time:

*Condition 1.*—No gate is being produced on lead 81 by 8-db control unit 24. Accordingly, the 8-db flip-flop is left in the "zero" state.

*Condition 2.*—A gate has been established well before—but overlapping—the sampling time. Flip-flop 80 is triggered into a "one" condition and remains so until reset during the next pulse.

*Condition 3.*—A change is taking place at the sampling time. This could result in ambiguity. An inhibiting mechanism must be provided to delay the sampling during the transient period. Flip-flop 80 is then set to a "one" state. During this transient period the control gate on lead 81 must be held up in delay line 82. (The action of each control unit, here unit 24, is so rapid that, if no precautions were taken, it would go to work on each individual sinusoidal cycle of the R.F. signal and attempt to square it up to a constant amplitude. Consequently the action has been deliberately slowed down so that no switching takes place unless a change is sustained for at least three cycles of the 200-kc. signal. During this 15-microsec. period, three unregulated cycles slip by. A factor of safety is introduced by making inhibiting gate 232 twenty microseconds long. Delay line 82 has been designed to schedule the arrival of control gate 81 at the sampling point (in about 10 $\mu$sec.) near the middle of the 20 $\mu$sec. inhibiting period.)

Figure 9:
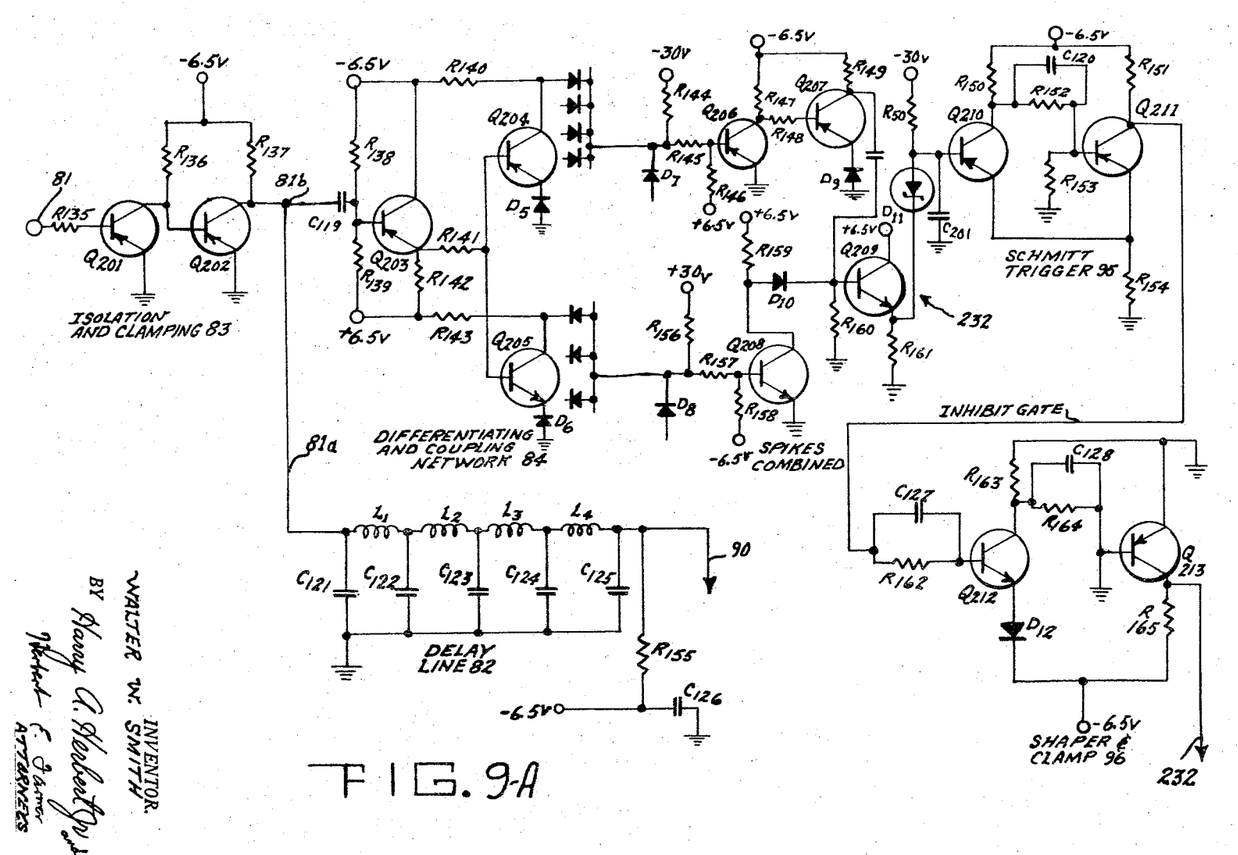
FIGURES 9a and 9b is a schematic diagram of a typical channel.

In all three cases isolation means 83 are provided, as shown in block form in FIGURE 5 and in schematic form in FIGURE 9, to prevent interaction between the digital processing and the R.F. signal. The circuit then bifurcates: one branch going via lead 81*a* to delay line 82, and the other via lead 81*b* to differentiating network 84. Differentiating network 84. Differentiation of control gate 81 yields two spikes 223 and 211 corresponding to the leading and trailing edges respectively. Both spikes warn that a change is taking place: leading edge 223 saying "a new gate has just been produced," and trailing edge 211 saying "a gate has just dropped out."

The need for the trailing edge gate, WASGATE, warning (there was a gate which has just dropped out) is because of the fact that later all the ISGATES (there *is* a new gate being produced) and the WASGATES are combined (FIGURE 9*a*)—for a change in one gate is often followed by compensating changes in other parts of the circuitry. For example: an increase of ¼ db might be just enough to trigger one of the 16-db stages to its unity gain mode. The remaining 15¾-db will be made up when the following stages revert to an amplifying condition. In this case a series of overlapping inhibiting gates 232 are produced, delaying the sampling until the gain has stabilized. "Sample and hold" (SAHO) gate 86 from the station clock is long enough to make it unlikely that the entire sampling period will be inhibited. If this should occur, all of the flip flops will remain in the zero state in which they were left by the reset trigger. The resulting indication would be self evident and can be disregarded: no ambiguity results. (A longer SAHO gate would minimize further the possibility of this occurring.)

Either spike 211 or 223 calls for inhibition of the sampling process. Consequently the spikes are shaped (FIGURE 9) into rectangular inhibiting gates 232 which are 20 microseconds long. They join "sample and hold" gate 86 from the station clock in diode "OR" gate 87. The timing of SAHO gate 86 is indicated in FIGURE 1.

If Condition 1 prevails, no gate is being produced, so there is no inhibiting gate 232 entering "OR" gate 87.

SAHO gate 86 passes through "OR" gate 87 and is differentiated (see FIGURE 9). The leading edge produces "read" trigger 88. The spike, of opposite polarity, produced by the trailing edge is discarded. But the life of "read" trigger 88 is short. In order for it to pass through "AND" gate 89 (FIGURE 5), a control gate 90 from delay line 82 must be in existence too. Since there is no control gate, trigger 88 is suppressed and flip-flop 80 remains in the "zero" state.

If Condition 2 prevails, a delayed control gate 90 will await "read" trigger 88 at "AND" gate 89. Trigger 88 will be passed through and flip-flop 80 will be set to a "one" condition. It will stay in this state until the next "reset" trigger arrives during the next pulse.

When Condition 3 occurs, inhibiting gate 232 awaits the arrival of SAHO gate 86. SAHO gate 86 is a negative going pulse which drops from ground potential. The polarity of inhibiting gate 232 is the opposite, rising to ground potential when present. It keeps SAHO gate 86 from dropping until the inhibition period is over. Differentiation then produces "read" trigger 88 later than if Condition 2 were in existence. This guarantees that delayed control gate 90 will be in "AND" gate 89 by the time read trigger 88 joins it, eliminating any possibility of a "race" between the two ending in a tie with consequent ambiguity.

Figure 6:
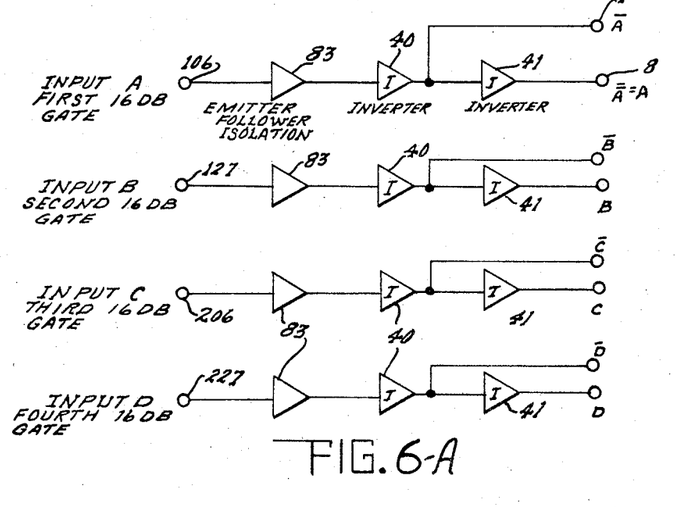
FIGURES 6a and 6b illustrate in block diagram and schematic form the processing of the most significant bits prior to combination in binary form.
Figure 7:
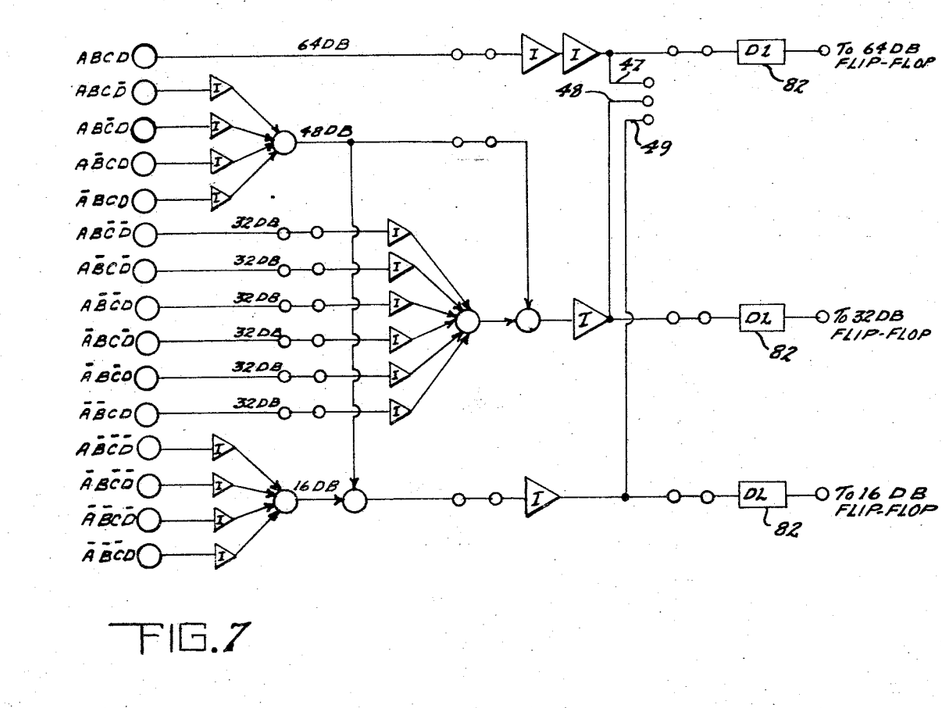
FIGURE 7 illustrates the combination of four 16-db gates into binary form.

Since the instant converter has ten binary flip-flops (64, 32, 16, 8, etc. db) with the first four stages, 10–13, having an equal value of 16db each, when binary information is needed for assimilation by a computer, the first four stages must be combined as indicated in FIGURES 6 and 7. The four 16-db circuits 10–13, are isolated by emitter follower 83 in the same manner as 8-db stage 14 to prevent interaction with the 200 kc. signal. Each waveform is then inverted by circuit 40 and reinverted by circuit 41 as shown in FIGURES 6*a* and 6*b* to give the elements needed, A, $\bar{A}$, B, $\bar{B}$, C, $\bar{C}$, D, $\bar{D}$, to solve the following Boolean equations.

The logic:
64=ABCD
48=ABC$\bar{D}$+AB$\bar{C}$D+A$\bar{B}$CD+$\bar{A}$BCD=32×16
32=AB$\bar{C}\bar{D}$+A$\bar{B}$C$\bar{D}$+A$\bar{B}\bar{C}$D=$\bar{A}$BC$\bar{D}$+$\bar{A}$B$\bar{C}$D
　　　+$\bar{A}\bar{B}$CD+48
16=A$\bar{B}\bar{C}\bar{D}$+$\bar{A}$B$\bar{C}\bar{D}$+$\bar{A}\bar{B}$C$\bar{D}$+$\bar{A}\bar{B}\bar{C}$D+48

The block diagram of FIGURE 7 shows how the Boolean relationships are accomplished. (It may appear at first glance that this circuitry is overly redundant but the redundancy is needed because although the four 16-db gates must be established in an orderly sequence, they can drop out in "equally likely" random manner. The outputs have been reduced to three binarily related branches 47–49 representing 64, 32, and 16 db respectively. From here on, the control gate pulses are handled in exactly the same manner as the 8-db pulse.

Figure 8:
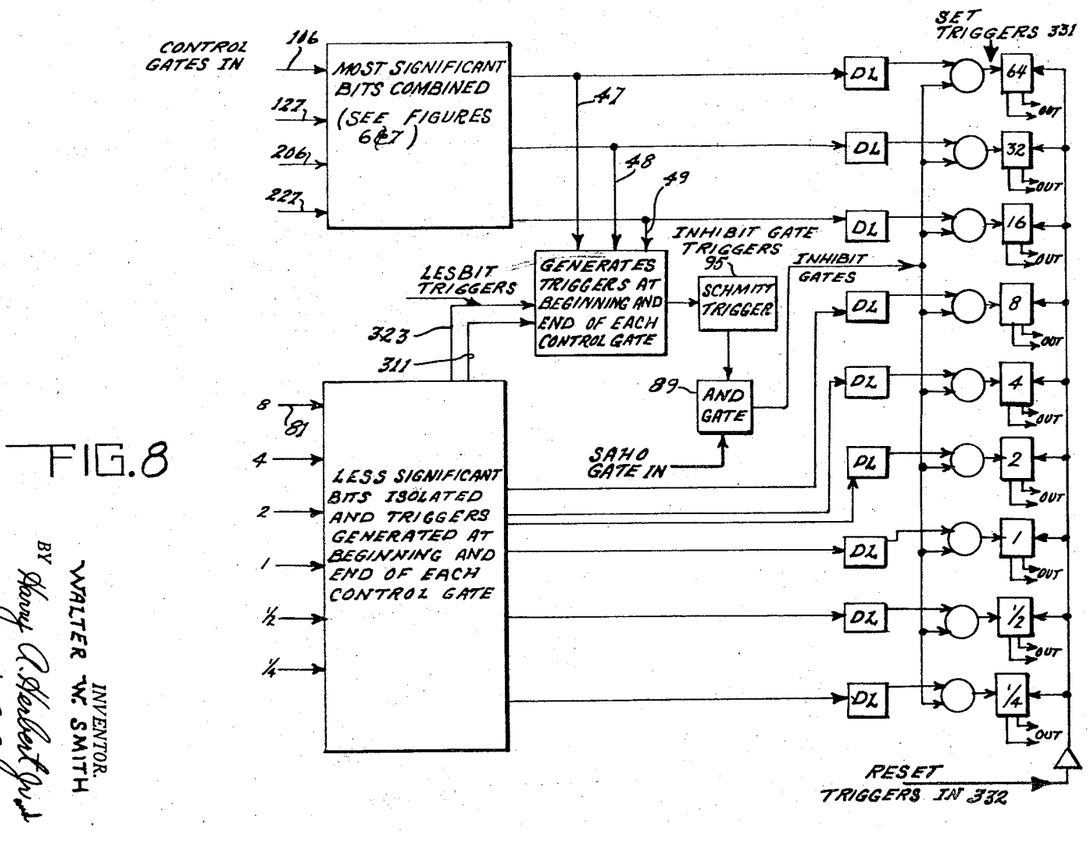
FIGURE 8 is a block diagram of the complete system of the preferred embodiment.

The production of inhibiting gates with every coming and going of a control gate (106, 127, etc.) anywhere in the system is accomplished as indicated in the block diagram for the complete system (FIGURE 8). The circuitry in FIGURE 9 is typical of what is inside blocks 83, 82, 84, 87, 89, and 80 in FIGURE 5. $Q_{201}$ and $Q_{202}$ (see FIGURE 9) isolate and clamp by circuit 83 the typical gate, e.g., 81, from the control unit. This gate may last but a few microseconds in a rapidly changing signal or for the duration of the received pulse in radar work, or indefinitely during C.W. operations. R-C network 84 coupling $Q_{202}$ and $Q_{203}$ differentiates gate 81 and produces two spikes 223 and 211 corresponding to the leading and trailing edges. The first, the ISGATE, says, "there is a new gate on its way through the delay line"; the second, the WASGATE, warns, "the sampling process must be held up because the gate in the delay line is no longer being produced." $Q_{204}$ and $Q_{205}$, in a circuit employing complementary symmetry, amplify and clamp the ISGATES AND WASGATES. They are combined with similar spikes (323 and 311 on FIGURE 8) from the other significant bits. Diodes D5 and D6 provide approximately three quarters of a volt of bias making transistors $Q_{204}$ and $Q_{205}$ insensitive to noise spikes.

$Q_{206}$, $Q_{207}$, and $Q_{208}$, and $Q_{209}$ combine the ISGATE AND WASGATE spikes from all the control units via lead 232. The oscillogram resembles a comb. The teeth of this comb indicate the coming and going of all gates controlling amplifiers 10–19; the spaces between the teeth indicate times when the amplifier is unchanging. The spikes comprising the teeth of the comb are broadened out by 470-pf. condenser C201 connected between the base of $Q_{210}$ and ground and clamped to an appropriate level by 6 volt Zener diode D11 and 50K puller resistor R50. $Q_{210}$ and $Q_{211}$ form Schmitt trigger 95 which squares up the broadened spikes 232. They are then further shaped and clamped by network 96 which includes $Q_{212}$ and $Q_{213}$ to form a squared inhibiting gate 232 of 20 microseconds duration which is amply sufficient to mask out the 15-microsecond period when transients may be present in the RF amplifier.

The inhibiting gates 232 go to OR gate 87 to join SAHO gate 86, brought in from the station clock. As long as either SAHO gate 86 or inhibiting gate 232 is at ground potential, pnp transistor $Q_{214}$ cannot conduct. When SAHO gate 86 arrives in the absence of an inhibiting gate, the base of transistor $Q_{214}$ drops to a negative value and conduction takes place. If, however, an inhibiting gate e.g. 232 is in existence at the time SAHO gate 86 arrives, the former will hold the base of transistor $Q_{214}$ at ground potential until the inhibiting gate drops out. Then transistor $Q_{214}$ will conduct. If the signal is changing rapidly, a second inhibiting gate could occur later in the SAHO period. This would cut off transistor $Q_{214}$ and then start it conducting a second time. The two resulting readings, taken during one sampling period, would be in conflict with each other as something must have changed in the meantime or the situation would not have arisen. This undesirable situation is forestalled by $Q_{215}$ and $Q_{216}$ which comprise a one-shot multivibrator 97 whose duration is longer (130 $\mu$sec.) than the SAHO gate. Since multivibrator 97 cannot be retriggered until after the SAHO time is over, multiple triggering is prevented. The leading edge of the one-shot pulse is differentiated and amplified by network 98 to produce spike 91 which is clamped by $Q_{218}$. Spike 91 produced by a trailing edge is discarded by $Q_{217}$.

Meanwhile the gate to be tallied, gate 81a has been progressing through delay line 82 and is now 90. It is fed into $Q_{220}$ and spike 86 from the SAHO circuitry is fed into $Q_{219}$. These two transistors $Q_{219}$ and $Q_{220}$ form AND gate 89. As long as delayed control gate 90 holds the base of $Q_{220}$ at ground potential transistor $Q_{220}$ will conduct. Since $Q_{220}$ is an emitter follower, the emitter will be held at essentially ground potential too. If the gate is negative, however, transistor $Q_{220}$ is cut off and the emitter of $Q_{220}$ will assume a potential determined by trigger spike 91A; the trigger "set" spike 331 is passed along.

$Q_{221}$ and $Q_{222}$ comprise the memory flip-flop. This flip-flop, e.g. 80, is reset to a zero condition by reset trigger 332 arriving from the station clock a few microseconds before the SAHO gate, having been isolated and amplified by $Q_{223}$. It is set to a "one" condition if a trigger, e.g. 331, is produced by $Q_{220}$. The level of "set" trigger 331 is matched to the triggering requirements of flip-flop 80 by 0.001-mf. condenser C201 following $Q_{220}$ and the reference voltage maintained by 8 v. Zener diode D17. Since flip-flop 80 is bistable it will remain in a given state until reset by another trigger. A "reset" trigger 332 will swing the output at terminal 201 to a negative value. It will stay negative until a control gate is generated. The next "set" pulse will swing terminal 201 positive; it will remain positive for the duration of the control gate except for the brief periods between subsequent "reset" and "set" pulses.

A transistorized tally light is connected to terminal 201, which glows whnever a control gate is being generated. The input of a $d/a$ converter is also driven from terminal 201 to provide a record on a chart. Terminal 207, decoupled by a 1-kilohm resistor, feeds this same information to the computer interface. The same information, but in opposite logic, is sent to the interface through a one kilohm isolating resistor and terminal 204.

By way of example, the following types of parameters are typical for the circuits shown in FIGURES 3, 4, 6, and 9.

Transistors:

| Transistors | Type |
|---|---|
| $Q_1$, $Q_2$, $Q_3$, $Q_4$, $Q_5$, $Q_6$ | Sylvania 2N388A NPN |
| $Q_{101}$, $Q_{102}$, $Q_{103}$, $Q_{107}$, $Q_{108}$, $Q_{109}$, $Q_{110}$, $Q_{114}$ | Sylvania 2N388A NPN |
| $Q_{104}$, $Q_{105}$, $Q_{106}$, $Q_{111}$, $Q_{112}$, $Q_{113}$ | GE 2N396 PNP |
| $Q_{201}$, $Q_{202}$, $Q_{203}$, $Q_{204}$, $Q_{206}$, $Q_{207}$, $Q_{210}$, $Q_{211}$, $Q_{213}$, $Q_{214}$, $Q_{215}$, $Q_{216}$, $Q_{218}$, $Q_{219}$, $Q_{221}$, $Q_{222}$ | GE 2N396 PNP |
| $Q_{205}$, $Q_{208}$, $Q_{209}$, $Q_{212}$, $Q_{217}$, $Q_{220}$, $Q_{223}$ | Sylvania 2N388A NPN |

Diodes:

| Diodes | Type |
|---|---|
| $D_1$, $D_2$, $D_7$, $D_8$, $D_{12}$, $D_{13}$, $D_{14}$, $D_{15}$, $D_{16}$, $D_{18}$, $D_{10}$, $D_{20}$ | Clevite CTP521 |
| $D_3$, $D_4$, $D_5$, $D_6$, $D_9$, $D_{21}$, $D_{22}$ | Si-SG22 |
| $D_{11}$ | 6 v. Zener |
| $D_{19}$ | 8 v. Zener |
| $D_{17}$ | 3 v. Zener |

Resistors

| Resistor: | Value | Resistor: | Value |
|---|---|---|---|
| R100 | 5K | R135 | 5.1K |
| R101 | 47K±1% | R136 | 2.4K |
| R102 | 3.9K±1% | R137 | 2.4K |
| R103 | 10K | R138 | 20K |
| R4 | 4.7K±1% | R139 | 20K |
| R3 | 4.7K±1% | R140 | 10K |
| R5 | 4.7K±1% | R141 | 500 |
| R104 | 91K | R142 | 10K |
| R105 | 30K | R143 | 10K |
| R106 | 2K | R144 | 15K |
| R107 | 910Ω | R145 | 2.4K |
| R108 | 110Ω | R146 | 15K |
| R109 | 110Ω | R147 | 2K |
| R110 | 50K±1% | R148 | 2.4K |
| R111 | 30K±1% | R149 | 2K |
| R112 | 20K±1% | R50 | 51K |
| R113 | 10K±1% | R150 | 5.1K |
| R114 | 50K±1% | R151 | 5.1K |
| R115 | 50K±1% | R152 | 5.1K |
| R116 | 10K | R153 | 15K |
| R117 | 5.1K | R154 | 1.8K |
| R118 | 1.8K | R155 | 5.1K |
| R119 | 5.1K | R156 | 15K |
| R120 | 1K | R157 | 2.4K |
| R121 | 2.2K | R158 | 15K |
| R122 | 1K | R159 | 2K |
| R123 | 30K±1% | R160 | 15K |
| R124 | 51K | R161 | 2K |
| R125 | 430Ω | R162 | 1.8K |
| R126 | 15K | R163 | 2.2K |
| R127 | 5K | R164 | 1.8K |
| R128 | 3K | R165 | 2.4K |
| R129 | 2.4K | R166 | 1K |
| R130 | 15K | R167, 168 | 15K |
| R131 | 2K | R169 | 2.4K |
| R132 | 2.4K | R170 | 2.2K |
| R133 | 2K | R171 | 6.1K |
| R134 | 15K | R172 | 2.2K |

Resistors—Continued

| Resistor: | Value | Resistor: | Value |
|---|---|---|---|
| R173 | 2.2K | R186 | 5.1K |
| R174 | 3K | R187 | 1K |
| R175 | 2.2K | R188 | 5.1K |
| R176 | 1.5K | R189 | 91K |
| R177 | 757 | R190 | 2K |
| R178 | 390Ω | R191, 192 | 47K |
| R179 | 680Ω | R193, 194 | 5.1K |
| R180 | 100K | R195, 196 | 1K |
| R181 | 2K | R201, 204, 207 | 1K |
| R182 | 20K | R197 | 1K |
| R183 | 10K | R198 | 560Ω |
| R184 | 1K | R199 | 5.1K |
| R185 | 2K | R200 | 91K |

NOTE.—Unless otherwise indicated, resistors are ±5%.

| Capacitors: | Type |
|---|---|
| C101 | .01 µf. |
| C102 | 1 µf. @ 35 v. tantalum. |
| C103 | 1 µf. @ 35 v. tantalum. |
| C104 | 47 µf. @ 20 v. |
| C105+C107 | .1 µf. ceramic @ 75 v. |
| C106, 108, 109 | 6.8 µf. @ 35 tantalum. |
| C110 | .001 disc ceramic. |
| C111 | .01 µf. |
| C112 | .01 µf. |
| C113 | 6.8 @ 35 v. DC. |
| C114 | 6 µf @ 50 v. DC. |
| C115 | .025 disc ceram. |
| C116 | 6.8 @ 35 v. D.C. |
| C117 | 33 µf. @ 10 v. DC. |
| C118 | 470 pf. disc ceramic. |
| C119 | 470 pf. disc ceramic. |
| C120 | 470 pf. disc ceramic. |
| C121, 125 | 390 pf. |
| C122, 123, 124 | 820 pf. |
| $L_{1, 2, 3, 4}$ | 10 mh. toroids. |
| C126 | .1 µf. disc. |
| C127 | .01 µf. disc. |
| C128 | .01 µf. |
| C129 | 220 pf. |
| C130 | .01 pf. |
| C131 | 220 pf. |
| C201 | .001 |
| C132, 133 | 470 pf. |
| C134 | .001 |

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit and scope of the invention. For example, when there is no change taking place in the input signal, but there is a very small signal necessitating amplification, elements 102 and 104 (as shown in FIGURE 4) can be eliminated and the control gate signal from isolation and clamp unit 111 can be fed directly to "and" gate 89, as can be the signal from "sample and hold" gate 86.

It is also to be noted that the gates produced to reduce the gain of certain stages to unity can also be used to control the gain of other channels, such as those in a monopulse radar, so that the same amount of amplification is given to all channels. Furthermore, this invention can be used in reverse, in an application such as in a radar signal simulator, by having a computer supply predetermined gates thus yielding the effect of an amplifier with an electronically variable attenuator without relying upon the linearity of essentially non-linear elements such as diodes.

I claim:
1. Analog-to-digital converter apparatus comprising, in combination, an R-F signal source, a plurality of amplifier stages connected in cascade, automatic gain control means connected to receive said R-F signal source simultaneously with each of said amplifier stages, the output from said gain control means controlling the operation of each of said amplifier stages, and means responsive to the output of said automatic gain control means for converting said R-F signals to digital signals, said automatic gain control means comprises a plurality of control unit means corresponding in plurality to the number of said amplifier stages, each of said control units connected in parallel with and controlling the operation of an associated amplifier stage, each control unit is connected to reference voltage means, means for measuring the amplitude of each of said input R-F signals and means for producing a control gate output when said input R-F signal exceeds a predetermined reference voltage value, said plurality of amplifier stages are arranged to form binary division of amplification, each of said amplifier stages including feedback means and transistor switching means, said switching means operating in a normally non-conducting state and being actuated by said gating means, a pulse from said gating means causing said switching means to short out part of said feedback means to change the associated amplifier stage from an amplifying condition to a condition where the signal passes unchanged when said R-F signal exceeds said reference voltage.

2. The apparatus as described in claim 1 wherein said means for producing a control gate comprises emitter-follower means, slicing level means connected to said emitter-follower means, reference voltage means, said slicing means producing an output signal when the peak-to-peak value of said input R-F signal exceeds a predetermined reference voltage, signal-shaping means for shaping said output signal from said slicing means, amplifying means interconnecting the output from said slicing level means and said signal-shapng means, and gate generating means connected to the output from said signal-shaping means.

3. The apparatus as described in claim 1 wherein said means for converting said R-F signals to digital signals comprises a plurality of digital processing means, one for each of said plurality of control units, each of said digital processing means comprising isolating means connected to the control gate output of a corresponding control unit, a control gate being produced when said R-F signal exceeds a predetermined reference voltage value, bifurcating circuit means connected to the control gate output from said isolating means comprising a delay network and a differentiating network, said differentiating network producing a pair of spikes, "or" gate means having first and second inputs, said first input of said "or" gate means being connected to signal sampling means, said second input of said "or" gate means being connected to said differentiating network, said "or" gate means responsive to the outputs from said sampling means and from said differentiating means, "and" gate means connected to the outputs from said last-mentioned differentiating means and from said delay network, and flip-flop means connected to the output from said "and" gate means, said flip-flop means being in a normally non-conducting condition, said "and" gate having an output only when said control gate output passing through said delaying network coincides with the arrival of an output from said last-mentioned differentiating means.

4. The apparatus as described in claim 5 which further includes means for producing inhibiting gates having a predetermined time period when said differentiating network produces a pair of spikes to prevent ambiguous readings of said input R-F signal when said input R-F signal is changing in amplitude during said sampling period, said inhibiting gates being opposite in polarity to the polarity of said sampling gate and thereby delaying said sampling gate from changing in voltage until said inhibition period is completed.

5. The apparatus as described in claim 5 wherein the time delay of said delay network causes said control gate output to arrive at about the middle point of said inhibiting period.

6. The apparatus as described in claim 5 which further includes a plurality of indicating means, one for each of said flip-flops, said indicating means which provides a visual output whenever said input R-F signal is being amplified being activated only when said input R-F signal is being amplified in the amplifier stage corresponding to the control unit output causing said flip-flop to be activated.

References Cited
UNITED STATES PATENTS 2,754,503 7/1956 Forbes _____ 340—347.1
3,158,818 11/1964 Plumpe _____ 330—136

MAYNARD R. WILBUR, *Primary Examiner.*

J. GLASSMAN, *Assistant Examiner.*